United States Patent [19]

Palmer

[11] 4,307,482
[45] Dec. 29, 1981

[54] WINDOW-MIRROR WIPER

[76] Inventor: Delbert W. Palmer, P.O. Box 204, Lathrop, Calif. 95330

[21] Appl. No.: 111,649

[22] Filed: Jan. 14, 1980

[51] Int. Cl.³ .......................... B60S 1/24; B60S 1/44
[52] U.S. Cl. .............................. 15/250 B; 15/250.29
[58] Field of Search ................... 15/250.29, 250 B, 250.24–250.27, 15/250.34

[56] References Cited

U.S. PATENT DOCUMENTS

| | | | |
|---|---|---|---|
| 2,131,341 | 9/1938 | Waters | 15/250.29 X |
| 2,677,844 | 5/1954 | McGlasson, Sr. | 15/250.29 |
| 3,526,920 | 9/1970 | Boyanich, Sr. | 15/250 B |
| 3,618,156 | 11/1971 | Riggs | 15/250 B |

*Primary Examiner*—Peter Feldman
*Attorney, Agent, or Firm*—Blair, Brown & Kreten

[57] ABSTRACT

Disclosed herein is a motor driven wiper device particularly for use with side-view mirrors on vehicles. A vertically or horizontally disposed wiper blade is mounted on a support arm and sweeps the surface of a side-view mirror in order to prevent the accumulation of debris or moisture which can interfere with rear view vision. The wiper blade support arm is normal to and slidably disposed on two transversely mounted rods, so that the wiper support arm sweeps back and forth along the length of the transverse rods. Two linkage arms located on the back face of the mirror connect the wiper support arm to the drive motor. The drive motor, and thereby the wiper blade, can be actuated from inside the cab of the vehicle.

2 Claims, 2 Drawing Figures

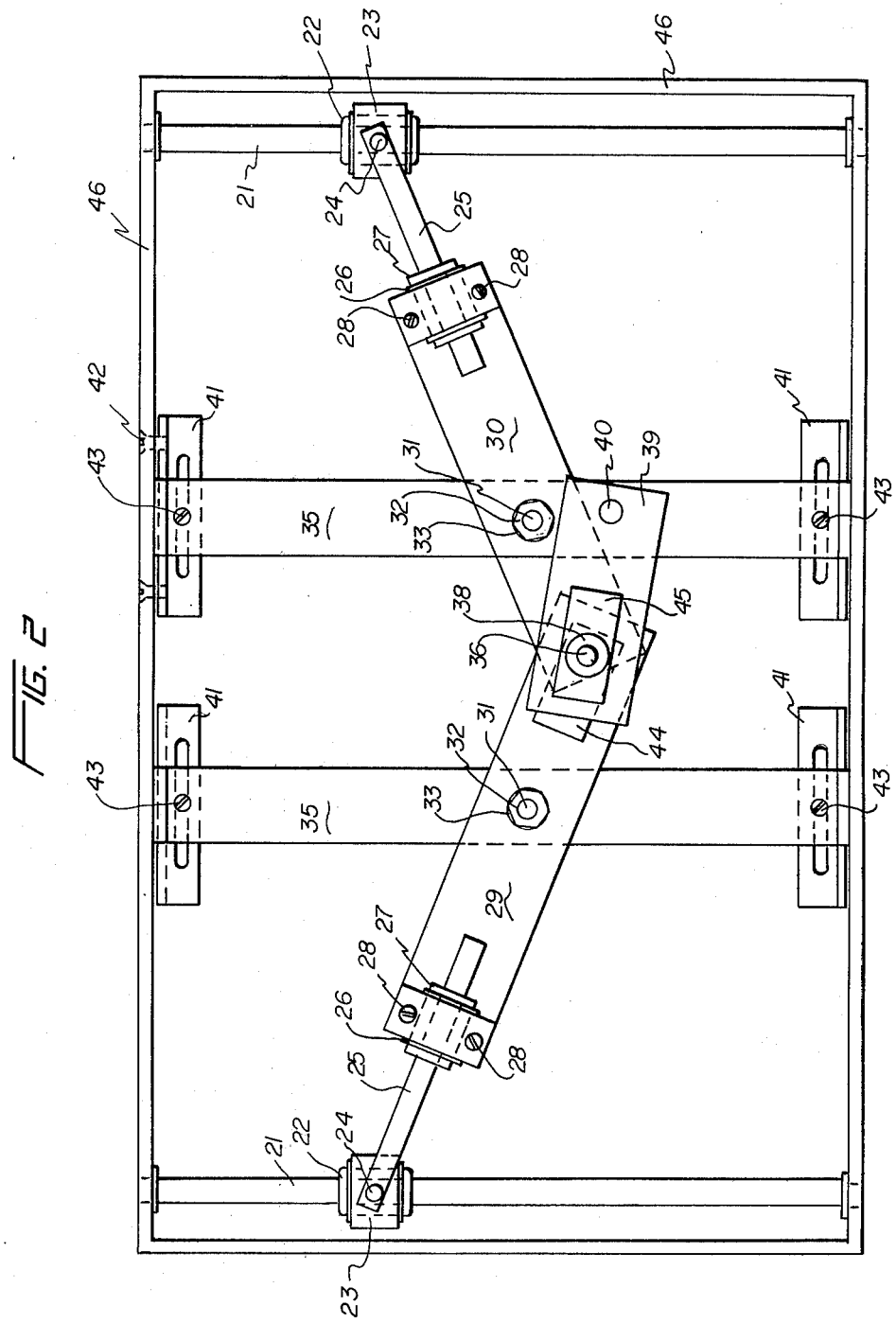

WINDOW-MIRROR WIPER

BACKGROUND OF THE INVENTION

The present invention relates to improvements in a wiper blade device for side-view mirrors. Any long vehicle travelling the highways, such as commercial trucks and automobiles towing trailers, requires a large side-view mirror in order to safely maneuver the vehicle while changing lanes and backing up. These large side-view mirrors are often provided on both sides of the vehicle's cabs and are essentially for safe operation of the vehicle. Adverse weather conditions can cause rain, snow, ice or road grime to accumulate on the surface of the side-view mirror and thereby inhibit essential rear view vision. Accordingly, keeping the surface of the side view mirror free of debris reduces the undesirable safety conditions resulting from obscuring of the driver's rear and side vision.

The installation of a motor driven wiper blade on the side-view mirror can prevent the accumulation of substances that interfere with vision. Accordingly, the following references would appear to be germane to the patentability of the present invention:

| 3,685,087 | Pittman | 3,940,822 | Emerick et al |
| 3,855,661 | Prince | 3,968,537 | Wagenhofer |
| 3,866,258 | DeGraw | | |

All of the references teach the use of wipers for use on side-view mirrors. None, however, utilizes the exact linkage mechanism of the present invention. The unique linkage system used in the present invention allows it to be adapted to most side-view mirrors in common usage. By adjusting the linkage, the distance and sweep of the wiper blade can be changed in the present invention.

SUMMARY AND OBJECTS OF THE INVENTION

Accordingly, it is a primary object of the present invention to provide a wiper blade that when actuated sweeps the reflective surface of a side view mirror in a reciprocating motion.

It is a further object of the present invention to employ a linkage system that allows the present invention to be deployed on mirrors of various sizes. This is accomplished in the present invention by using linking rods and slide collar bearings so that the throw of the wiper blade can be adjusted accordingly.

It is a further object of the present invention that the wiper blade cleans the entire surface of the mirror including all four corners. This is accomplished in the present invention by having the wiper support arms from both the top and bottom ends so that the wiper blade sweeps the entire surface of the mirror.

It is a still further object of the present invention to provide a control switch located inside the cab of the vehicle. This switch can be of the on/off variety or the rheostat variety, so that the velocity of the wiper blade can be adequately controlled.

Other objects and advantages of the present invention will become apparent in the following specification when considered in light of the attached drawings.

BRIEF DESCRIPTION OF THE DRAWINGS

FIG. 2 is a back side view dipicting the power source and linkage arms of the present invention.

DESCRIPTION OF THE PREFERRED EMBODIMENT

Figure 1:
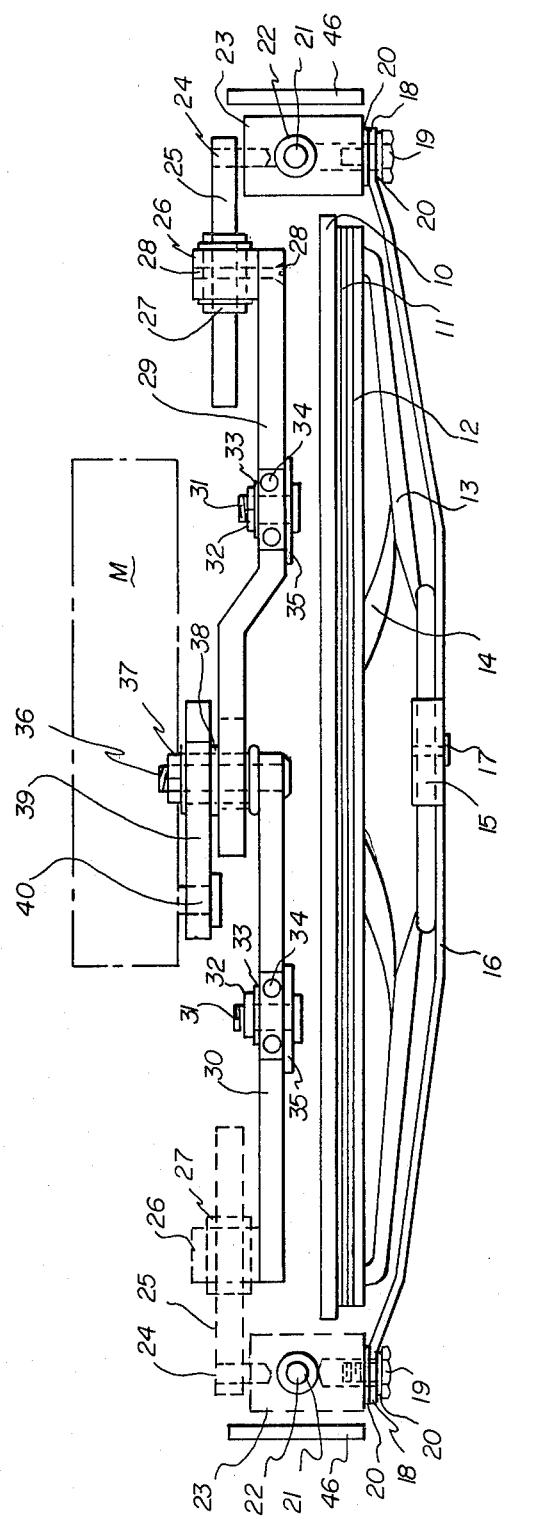
FIG. 1 is a side view of the present invention.

Referring now to the drawings in detail, wherein like reference characters indicate like parts throughout the several figures, the reference numeral 10 refers generally to the reflective glass surface of a side-view mirror, shown in FIG. 1. The rubber wiper blade 11 is disposed in a metal channel 12 so that the blade can be easily replaced when necessary. The wiper blade arm 13 and blade arm spring 14 maintain adequate tension between the rubber wiper blade 11 and the reflective surface 10. The wiper blade arm 13 is mounted to the blade support arm 16 by a mounting tab 15 and a set screw 17. Each end of the wiper support arm is bent into a loop 18 and attached to a control block 23 by means of a bolt 19 and two washers 20. Each of the two control blocks 23 contains a linear collar bearing 22 and is slidably disposed on a transverse rod 21 of which there are two.

The transverse rods 21 are located at opposite extremities of the reflective mirror plate 10, and the rods run parallel to one another from one side of the mirror plate to the other. It should be understood that this linkage system may be deployed in either a vertical or horizontal manner so that the wiper blade 11 and support arm 16 can sweep either vertically or horizontally.

On the opposite end of the control block 23 from where the support arm is attached is located a pivot pin 24, best shown in FIG. 2. A linkage rod 25 is pivotally connected to each of the two pivot pins 24. Each linkage rod 25 is received by and travels through a linkage slider block 26 which has a linear bearing 27 and is similar to the main control block 23 that is slidably disposed on the transverse rod 21. One linkage slider block 26 is mounted to the outer extremities of the primary linkage bar 29 by two mounting screws 28, and similarly the other linkage slider block is mounted to the outer extremity of the secondary linkage bar 30. Both the primary and secondary linkage bars 29 and 30 are pivotally mounted at a medial portion to two transverse flat bars 35 which are connected to the rim portion 46 by a series of four slotted angle support pieces 41 which are mounted to the rim portion 46 by mounting screws 42 as depicted in FIG. 2.

The transverse flat bars 35 are connected to the angle support piece 41 by a mounting bolt 43 in such a manner that the distance between the flat bars 35 can be adjusted via the slot in the angle support piece 41.

The primary linkage bar 30 pivots about a pivot pin 31 projecting upwardly from a central portion of the flat transverse bar 35. A ball bearing 34 supported in the primary bar 30 allows the linkage arm to pivot about the pivot pin 31 as best shown in FIG. 1. The bearing 34 is held in place by a bearing retaining washer 33 and a nut 32 that screws onto the threaded end of the pivot pin 31. Likewise, the exact same bearing configuration connects the secondary linkage bar 29 to the other flat transverse bar 35, thus allowing the same pivotal freedom.

The primary linkage pin 36 protrudes upwardly from and is affixed to the innermost extremity of the primary linkage bar 30. The primary linkage pin is also provided with a bearing collar 38 and a nut 37 to hold the collar in place. The primary linkage pin extends upwardly capturing the slot 44 in the secondary linkage arm and the slot 45 in the power arm 39 which is driven by the motor drive pin 40, as shown most clearly in FIG. 1 where M represents the motor.

The motor drive pin, which may be driven by a number of different motor sources including pneumatic, rotates back and forth a fixed number of degrees causing an oscillatory reciprocating motion in the power arm 39. This motion is translated to the primary and secondary linkage bars 30 and 29 by the primary linkage pin 36 which rides in the slot 45 in the power arm 39 and the slot 44 in the secondary linkage arm 29. As the primary linkage pin 36 is driven up and down by the power arm 39 the motion is translated to the primary and secondary linkage arms which pivot about the two pivot pins 31 and thereby drive the two control blocks 23 along the transverse rod 21 from one extremity to the other. This in turn drives the support arm 16 to which the wiper blade is connected. The fact that the linkage rods 25 are slidably connected to the primary and secondary linkage bars allows the distance of the linkage system to vary according to the position of the blocks 23 along the transverse rods 21.

Having thus described the preferred embodiment of the invention it should be understood that numerous structural modifications and adaptations may be resorted to without deparing from the spirit of the invention.

What is claimed is:

1. A wiper particularly for use with side view mirrors on vehicles comprising:

a wiper blade placed on a mirror surface, a support arm carrying said blade having top and bottom extremities slideably disposed on transverse rods through first and second control blocks which slide on said transverse rods and connect said support arm to linkage means so that said support arm translates along the length thereof, said linkage means connected to said support arm on a back face of the mirror, through said control blocks, said linkage means comprising first and second links connected to said top and bottom extremities of said support arm, each of said first and second links having extensible medial portions and motor means connected to said linkage means whereby running said motor means moves said linkage means and therefore said wiper.

2. The device of claim 1 in which a third link is pinned at one point to said first and second links at their extremities remote from the connection to said support arm, said third link connected to a motor whereby rotation of said third link by said motor imparts lateral oscillatory translation to said support arm.

* * * * *